March 12, 1957 LE ROY W. FERBER 2,785,038
MAGNETIC TRANSDUCER
Filed June 2, 1952

INVENTOR
Le Roy W. Ferber
BY Morris A. Rabkin
ATTORNEY

United States Patent Office 2,785,038

Patented Mar. 12, 1957

2,785,038

MAGNETIC TRANSDUCER

Le Roy W. Ferber, Haddon Heights, N. J., assignor to Radio Corporation of America, a corporation of Delaware Application June 2, 1952, Serial No. 291,179

4 Claims. (Cl. 346—74)

This invention relates to magnetic recording and reproducing, and more particularly to an improved multi-channel magnetic record transducer.

In the art relating to automatic accounting equipment wherein use is made of the facilities afforded by magnetic recording techniques, it is usual to provide a transducer unit having a plurality of heads for accommodating a plurality of parallel record tracks on a record receiving medium. It is usual to make each of these record translating heads by providing a plurality of thin laminations of a suitable magnetizable metal or alloy. Then several of the laminated heads are assembled with suitable spacers between them, to form a head assembly or transducer unit, which is, frequently, then potted in a resin or plastic block.

It is apparent that the production of such transducers is considerably hampered by the difficulty experienced in handling a number of small laminations. There are such problems as holding the several heads in alignment while signal coils are being placed thereon, and maintaining the alignment of the heads while they are being assembled. Since the individual laminations may be as small as a quarter of an inch in their greatest dimension, the assembly of the individual heads presents a tedious production process.

It is, accordingly, an object of this invention to provide an improved multi-channel magnetic record transducer in which the foregoing and other disadvantages are obviated.

It is another object of this invention to provide an improved multi-channel magnetic record transducer wherein each half of a bi-part structure is unitary or integral.

It is a further object of this invention to provide an improved multi-channel magnetic record transducer wherein each half of a bi-part structure is produced from a single piece of material.

In accomplishing these and other objects, there has been provided, in accordance with the present invention, a novel magnetic record transducer unit wherein the unit comprises a plurality of signal translating heads having a common base.

A better understanding of the present invention may be had from the following detailed description when read in connection with the accompanying drawing in which.

Figure 1:
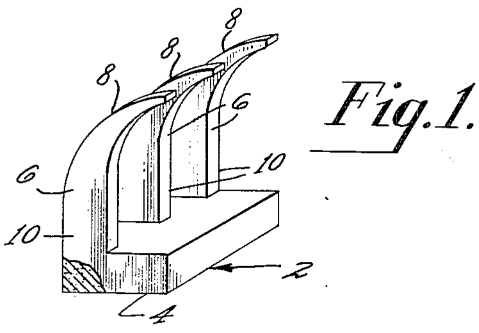
Fig. 1 is a perspective view, partly cut away, of one-half of a transducer unit constructed in accordance with the present invention.

Referring now to the drawings in more particularity, Fig. 1 shows a transducer core section 2 comprising a common base member 4 and a plurality of spaced parallel legs 6 rising from the base member. In a conventional transducer made of a suitable magnetizable material or alloy, it has usually been found necessary to employ the use of a laminated structure. The thin laminations of the conventional structure prevent the circulation of eddy-currents in the metal of the cores which would cause iron losses. However in accordance with the present invention the transducer cores are made from a moldable magnetic material which may be, for example, a homogeneous crystalline material composed of ferric-oxide and oxide of another metal. This material is known in the art and will be referred to hereinafter as "ferrite." In addition to the foregoing characteristics, ferrite is also characterized by having a relatively high electrical resistivity. The magnetic and electrical characteristics of ferrite render it suitable for use in magnetic cores for transducers and the like without the necessity of employing a laminated structure. The high electrical resistivity substantially eliminates the circulation of eddy-currents therein.

Figure 2:
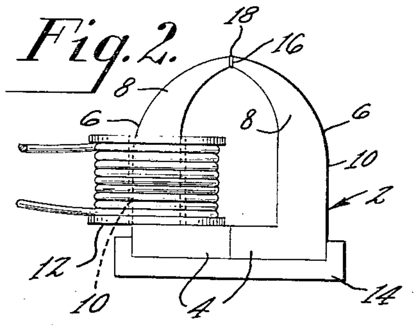
Fig. 2 is an elevational view of a transducer embodying the present invention.

In the production of a core section 2 such as shown in Fig. 1 the ferrite material may be molded and machined or either to produce the end product. The upstanding legs 6 of the transducer are formed with a curved portion 8 and a straight portion 10. Each leg 6 of the transducer, including the straight portion 10, is of such dimensions that a signal coil 12 such as shown in Fig. 2 may be positioned on the straight portion 10. If the dimensions of the curved portion 8 of the upstanding leg 6 are carefully chosen, a pre-wound coil 12 may be slipped over the leg and brought to rest on the straight portion 10 thereof.

Figure 3:
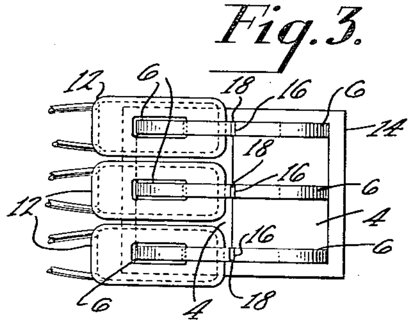
Fig. 3 is a plan view of the structure shown in Fig. 2.

Two core sections, such as shown in Fig. 1, may be placed in face to face relation, as shown in Figs. 2 and 3, and held together by a suitable clamping means represented by the block 14 which may be made, for example, of a suitable plastic material. When the two core sections are thus assembled, the ends of the curved portions 8 of the upstanding legs 6 substantially meet at the center line of the structure and define a signal translating gap 16. A suitable shim or spacer 18 is inserted in the gap 16. This spacer should be of a conducting material such as beryllium copper and on the order of .0005 of an inch thick. The common base members 4 of the two core sections abut each other at the center line and provide a flux return path for the structure. In this manner, one leg 6 of one core section is paired with a leg 6 of the other core section and constitutes a signal translating head. The other legs of the core sections are similarly paired. Because of the high resistivity of the ferrite material and because the shortest flux path through a particular head offers the least reluctance to the flux, cross-talk between adjacent heads is substantially negligible.

Figure 4:
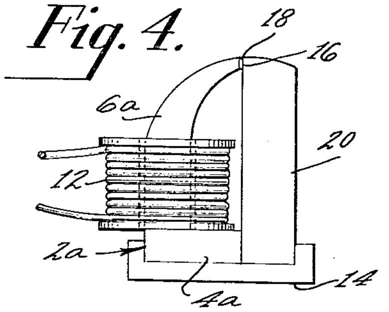
Fig. 4 is an elevational view of another structure also embodying the present invention.
Figure 5:
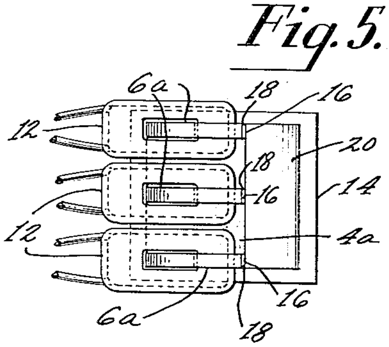
Fig. 5 is a plan view of the structure shown in Fig. 4.

In the structure shown in Figs. 4 and 5 one of the transducer core sections 2*a*, which is or may be identical with the core sections 2, shown in Fig. 1, is used in conjunction with a solid member 20 which is common to all of the head elements 6*a*. In other words, one section 2*a* of the transducer of Fig. 4 has the common base member 4*a* and the spaced but integral legs, whereas the second section 20 does not have the legs but is continuous throughout its length.

In the form of the invention shown in Figs. 2 and 3, a single signal coil 12 is illustrated for each of the heads, the coils being located on one of the upstanding legs. However, it should be understood that a similar coil may be placed on each of the opposite legs and corresponding pairs of coils connected in series-aiding thus increasing the amplitude of the transferred signal. When the transducers are used in pulse recording as, for example, in a computer, a single coil is sufficient.

Thus it may be seen that there has been provided in accordance with the present invention, an improved magnetic recording transducer unit wherein each of the two sections of a bi-part structure are integral thereby greatly facilitating handling during the assembly process.

What is claimed is:

1. A multi-channel magnetic record transducer comprising first and second magnetic core structures, said first core structure comprising a member having a base portion and a plurality of leg portions spaced laterally along said base portion and extending therefrom in the same direction, and said second core structure comprising a single body having a continuous surface, one edge of said surface being spaced from the free end of each of said core members to define individual signal translating gaps therewith, said body having magnetic contact with said base portion to provide a magnetic path common to each of said leg portions.

2. A multi-channel magnetic record transducer comprising a bi-part core structure of magnetic material, one part of said core structure having a base member and a plurality of leg members integral with said base member and extending therefrom in the same direction, each of said leg members being adapted to receive an individual signal translating coil, and the other part of said core structure comprising a solid body of magnetic material having a continuous surface, a portion of said surface effectively magnetically contacting said base member, and another portion of said surface being spaced from the free ends of each of said leg members to define individual translating gaps therewith.

3. A multi-channel magnetic record transducer comprising first and second core structures, said first core structure comprising a plurality of core members of magnetic material spaced laterally from each other and extending in the same direction, and said second core structure comprising a single body of magnetic material having a continuous surface, one edge of said surface being spaced from one end of each of said plurality of core members to define individual signal translating gaps therewith, the other ends of each of said plurality of core members having magnetic contact with said body to provide a magnetic circuit common to each of said plurality of core members.

4. A multi-channel magnetic record transducer according to claim 3, wherein the material of said core sections is ferrite.

References Cited in the file of this patent

UNITED STATES PATENTS

| | | |
|---|---|---|
| 1,366,979 | Ullrich | Feb. 1, 1921 |
| 2,425,003 | Potter | Aug. 5, 1947 |
| 2,427,421 | Rieber | Sept. 16, 1947 |
| 2,452,529 | Snoek | Oct. 26, 1948 |
| 2,540,711 | Camras | Feb. 6, 1951 |
| 2,700,588 | Williams et al. | Jan. 25, 1955 |

FOREIGN PATENTS

| | | |
|---|---|---|
| 495,866 | Great Britain | Nov. 22, 1938 |